C. H. COOK.
FRICTION DISK FOR FRICTION CLUTCHES.
APPLICATION FILED DEC. 27, 1915.
1,196,843.
Patented Sept. 5, 1916.
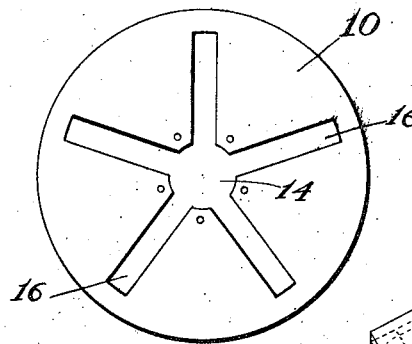
Fig. 3.
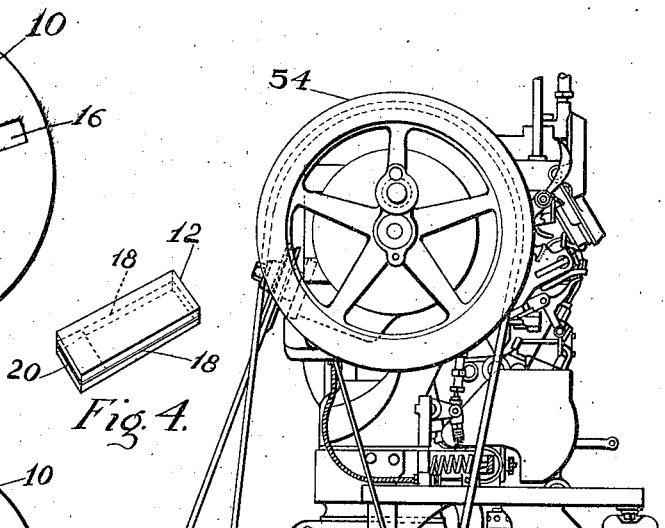
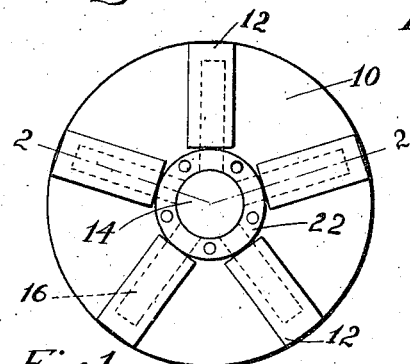
Fig. 1.
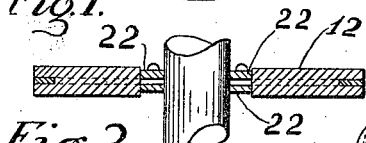
Fig. 2.
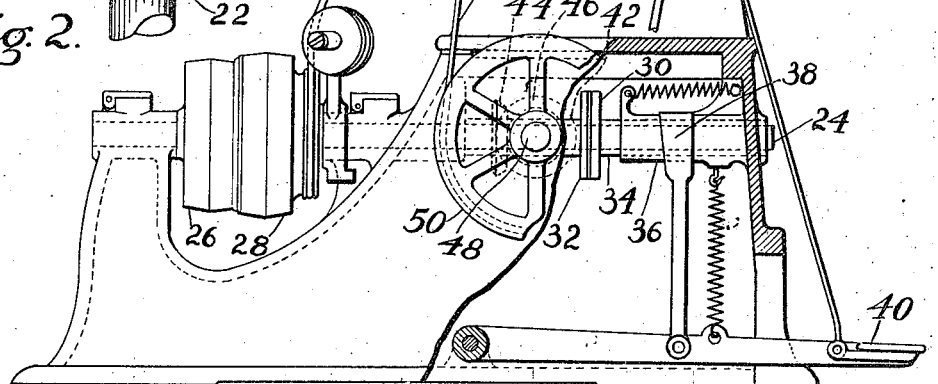
Fig. 5.
INVENTOR:
Charles H. Cook
by his attorneys

UNITED STATES PATENT OFFICE.

CHARLES H. COOK, OF GARDINER, MAINE, ASSIGNOR TO UNITED SHOE MACHINERY COMPANY, OF PATERSON, NEW JERSEY, A CORPORATION OF NEW JERSEY.

FRICTION-DISK FOR FRICTION-CLUTCHES.

1,196,843.  Specification of Letters Patent.  Patented Sept. 5, 1916.

Application filed December 27, 1915. Serial No. 68,770.

*To all whom it may concern:*

Be it known that I, CHARLES H. COOK, a citizen of the United States, residing at Gardiner, in the county of Kennebec and State of Maine, have invented certain new and useful Improvements in Friction-Disks for Friction-Clutches; and I do hereby declare the following to be a full, clear, and exact description of the invention, such as will enable others skilled in the art to which it appertains to make and use the same.

This invention relates to friction disks for friction clutches.

A common form of friction clutch consists of a driving plate and a driven plate concentrically mounted and a friction disk loosely mounted on the shaft between them. The friction disk is usually a solid leather disk, and any oil which works in between the driving and driven plates coats the surface of the leather disk so that it loses its frictional resistance. When the friction disk having a coating of oil is pressed between the driving plate and driven plate, the plates will slip, or move relatively to one another, and generate sufficient heat to burn the leather disk. After the leather has been burned, it soon disintegrates, and has to be replaced.

The primary object of the present invention is to improve the construction and arrangement of friction disks of friction clutches to give them a greater rigidity and wearing power and improve their efficiency.

With this object in view, the invention consists in the improved friction disk hereinafter described and claimed.

The various features of the preferred form of the invention are illustrated in the accompanying drawings, in which—

Figure 1 is a side elevation of the improved friction disk; Fig. 2 is a section of the friction disk taken on the line 2—2 of Fig. 1; Fig. 3 is a side elevation of the body plate of the friction disk with the friction elements removed; Fig. 4 is a perspective view of one of the friction elements of the disk, and Fig. 5 is a view in side elevation showing an outsole shoe sewing machine of well-known construction embodying the invention.

The friction disk shown in the drawing consists of a metallic body plate 10 carrying a series of friction elements or inserts 12. The body plate has a central opening 14 to receive the driving shaft, and has a series of radial slots 16 extending from the central opening 14 close to the periphery of the plate. The friction elements or inserts 12 consist of blocks of leather, or similar material, having a pair of longitudinal grooves 18 and a transverse groove 20 formed by slitting the edge of the leather block. The grooves 18 are spaced apart in the body of the leather element by a distance about equal to the width of the slot 16, and the groove 20 has a depth substantially equal to the distance of the end of the slot 16 from the periphery of the body disk 10. The friction element may be inserted in the slots 16 by starting the element in the central opening 14 with the edges of the slot 16 in the grooves 18, and sliding the element out to the periphery of the plate 10. The groove 20 will permit the frictional blocks to be forced radially outward beyond the end of the slots 16 so that the end of the frictional element will be substantially flush with the periphery of the disk. After the friction elements have been placed in the slot 16, they may be held from radial movement by a pair of washers 22, one placed on each side of the plate 10, and riveted in position. The washers 22 have a central opening substantially the size of the opening 14 of the body plate, and aid in building up a bearing for the friction disk.

The invention is illustrated as embodied in a well-known type of outsole shoe sewing machine. This machine has a driving shaft 24 provided with a loose pulley 26 and tight pulley 28. The friction clutch consists of a driving disk 30 and a driven disk 32 which have the improved friction disk loosely mounted on the shaft 24 between them. The driving disk 30 is splined to the shaft 24, and has a hub 34 which bears against a longitudinally movable block 36. The block 36 is moved back and forth toward the disk 30 by means of a wedge 38 which is operated by a treadle 40. The driven disk 32 is attached to a sleeve 42 which is loosely mounted on the shaft 24. The sleeve 42 carries a beveled gear 44 which meshes with a beveled gear 46 on the cross shaft 48. The cross shaft 48 in turn has a driving pulley 50 connected by a belt 52 with a driving pulley 54 on the head of the machine. With this construction, when the treadle is moved down, the wedge block 36 forces the driving disk 30 toward the driven disk 32 to clamp the friction disk between them. The grip of the friction disk upon the driven disk 32 in turn imparts motion to the cross shaft 48, pulley 50 and belt 52.

The body plate 10 forms a convenient carrier for the friction elements and gives a much more rigid disk than a leather disk. The leather frictional inserts extend beyond each side of the plate 10 so that the plate does not come in contact with the driving or driven plates of the friction clutch. The spaces between the friction elements form convenient openings into which the oil may collect and prevent the surfaces of the friction elements from being coated. This construction is especially advantageous in that the number of frictional elements can be decreased or increased according to the power required. The friction elements also may be easily inserted or removed for replacement when they become worn out.

The number and particular arrangement of the friction elements on the body plate is capable of great variation, and can be arranged to meet any mechanical demand, and except as limited by the claims, the invention is not confined to the arrangement shown.

Having thus described the invention, what is claimed as new is:

1. A friction clutch disk comprising a body plate, and a plurality of friction members slitted at their edges intermediate their operative surfaces and interlocked at their slitted edges upon the body plate.

2. A friction clutch disk comprising a body plate having a plurality of slots, and frictional inserts having slitted edges interlocked with the edges of the slots of the plate.

3. A friction clutch disk comprising a body plate centrally perforated and having a plurality of radial slots terminating short of the edge of the plate, and frictional inserts having slitted edges interlocked with the edges of the slots.

4. A friction clutch disk comprising a body plate centrally perforated to receive a shaft and having a plurality of radial slots opening at their inner ends into the shaft aperture and terminating within the edge of the plate, and friction elements having their edges slitted and inserted into the slots and overlapping the surface of the plate, said elements being of less length than the distance from the edge of the shaft aperture to the plate rim, and means secured to the plate for engaging the inner ends of the inserted elements.

CHARLES H. COOK.